United States Patent

Bunnell, III et al.

[11] 4,004,763
[45] Jan. 25, 1977

[54] ARTICULATED HIGH "G" PILOT'S SEAT

[75] Inventors: Frederick E. Bunnell, III, Burbank; Henry G. Combs, Canyon Country, both of Calif.

[73] Assignee: Lockheed Aircraft Corporation, Burbank, Calif.

[22] Filed: Sept. 2, 1975

[21] Appl. No.: 609,214

Related U.S. Application Data

[63] Continuation-in-part of Ser. No. 488,426, July 15, 1974, abandoned.

[52] U.S. Cl. .................. 244/122 R; 244/122 AG; 297/318; 297/404
[51] Int. Cl.² .......................................... B64D 25/02
[58] Field of Search ............ 244/122; 2/6; 297/61, 297/83, 216, 316, 317, 318, 341, 340, 342, 320, 333, 404, 391, 405, 410

[56] References Cited

UNITED STATES PATENTS

| | | | |
|---|---|---|---|
| 911,933 | 2/1909 | Bahr | 297/406 |
| 2,492,106 | 12/1949 | Orton | 297/318 |
| 3,098,631 | 7/1963 | Hall et al. | 244/122 R |
| 3,123,326 | 3/1964 | Kenyon | 244/122 AG |
| 3,645,480 | 2/1972 | Forman | 244/122 AG |
| 3,826,434 | 7/1974 | Von Beckh | 244/122 R |
| 3,922,034 | 11/1975 | Eggert | 297/391 |

FOREIGN PATENTS OR APPLICATIONS

| | | | |
|---|---|---|---|
| 978,422 | 12/1964 | United Kingdom | 244/122 AG |
| 1,056,648 | 1/1967 | United Kingdom | 244/122 R |

*Primary Examiner*—Trygve M. Blix
*Assistant Examiner*—Galen L. Barefoot
*Attorney, Agent, or Firm*—Billy G. Corber

[57] ABSTRACT

An articulated high "G" force aircraft seat which is movable between a conventional upright position and a reclined position. As described, the head and eyes remain in a relatively stationary position without affecting instrument monitoring or external vision. The aircraft controls remain within easy reach, yet the pilot is able to sustain high acceleration maneuvers in excess of eight "G's".

7 Claims, 7 Drawing Figures

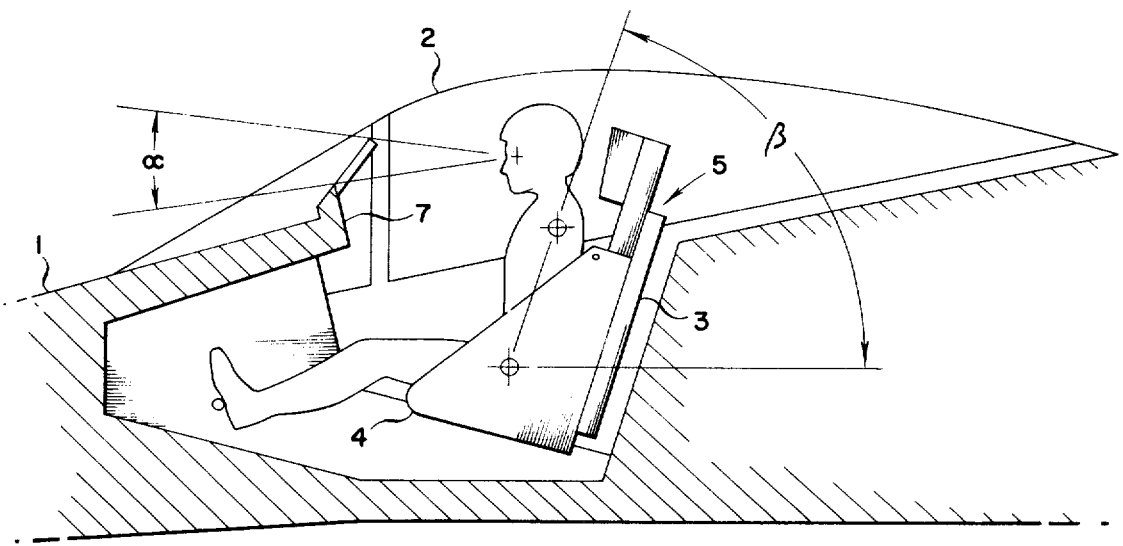
Fig. 1
Fig. 3
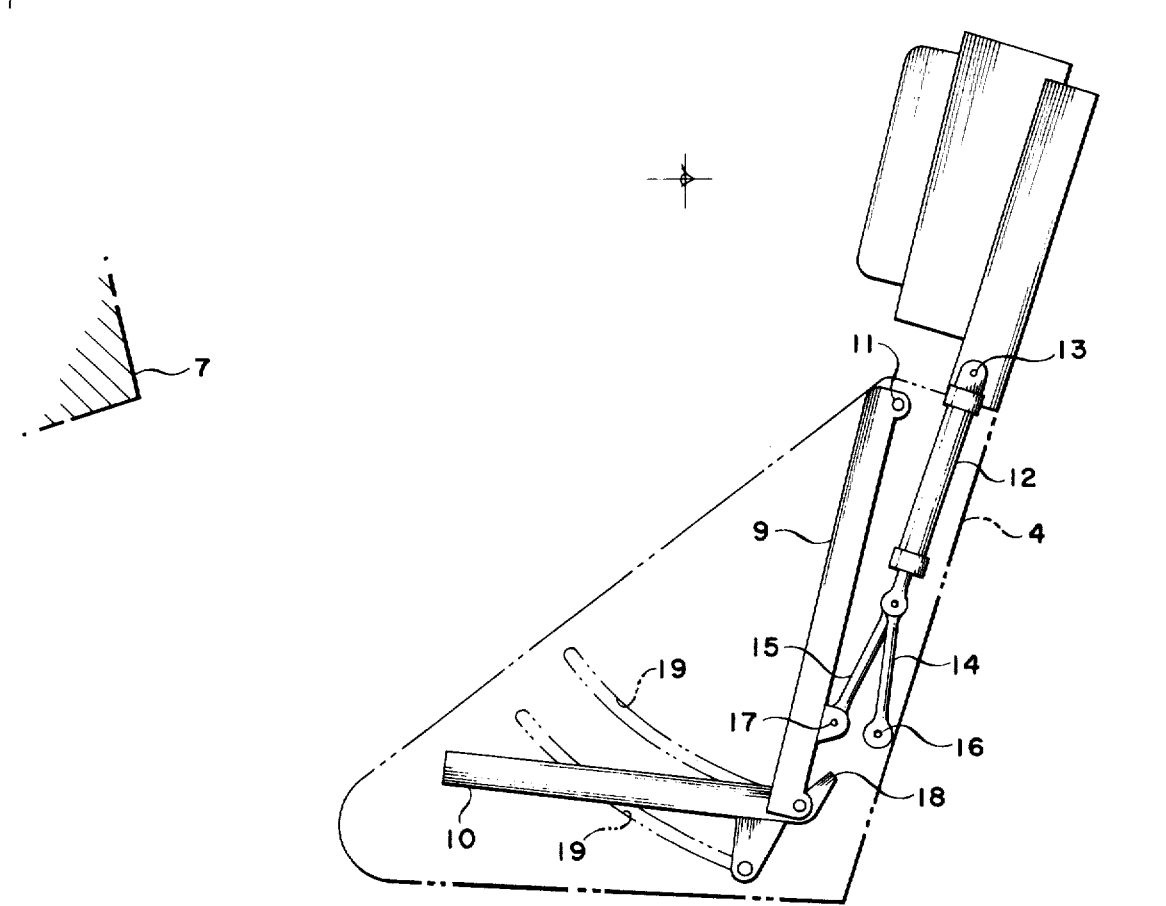

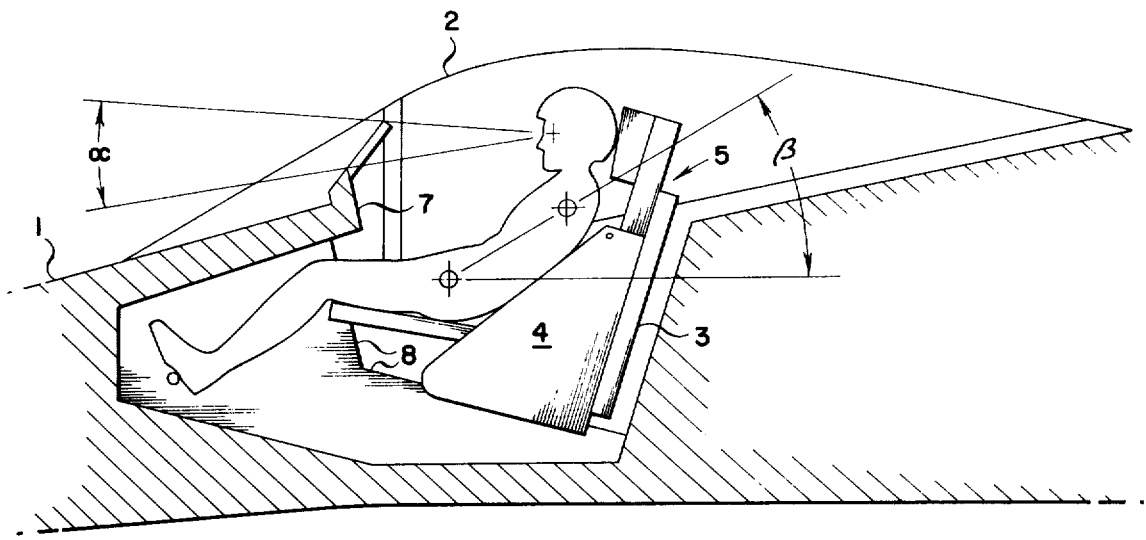
Fig. 2
Fig. 4
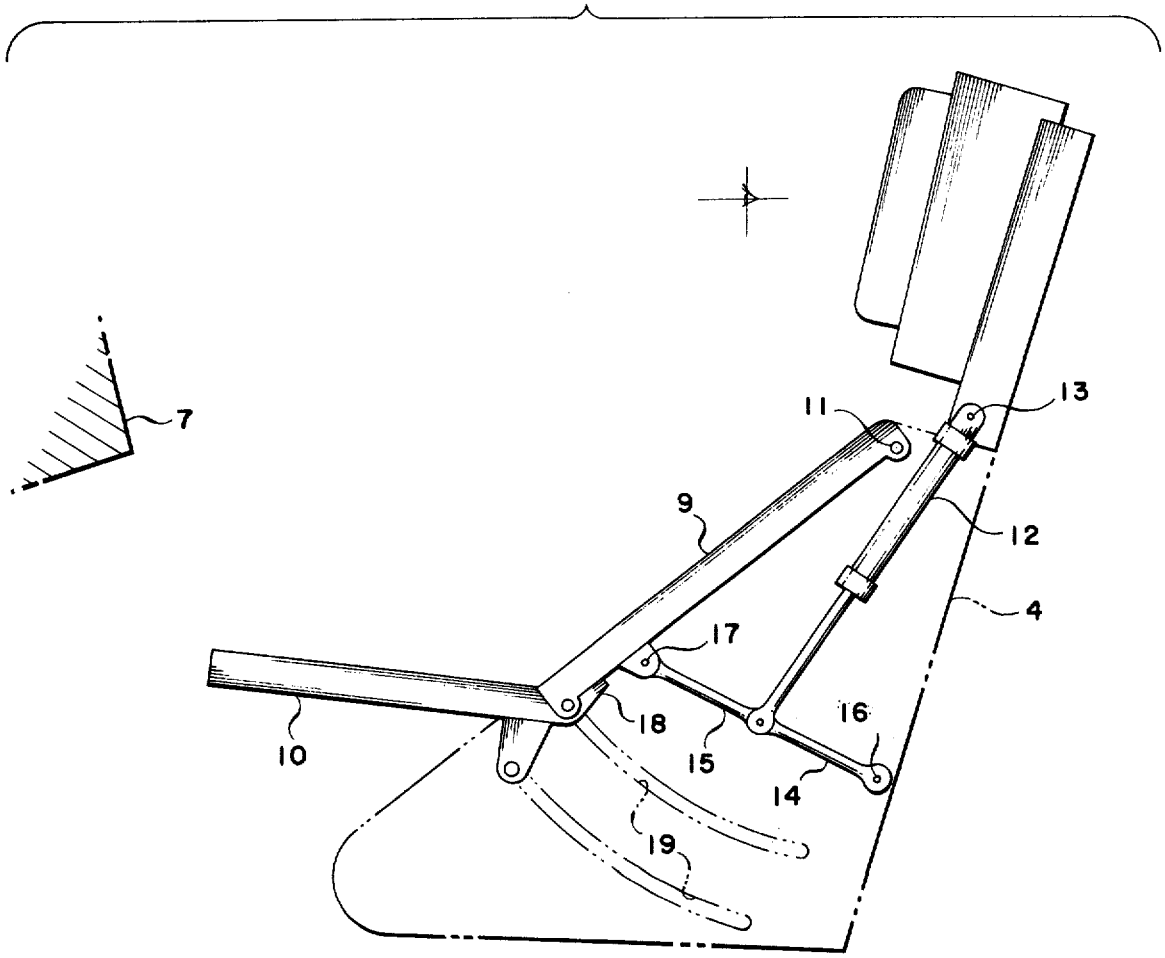

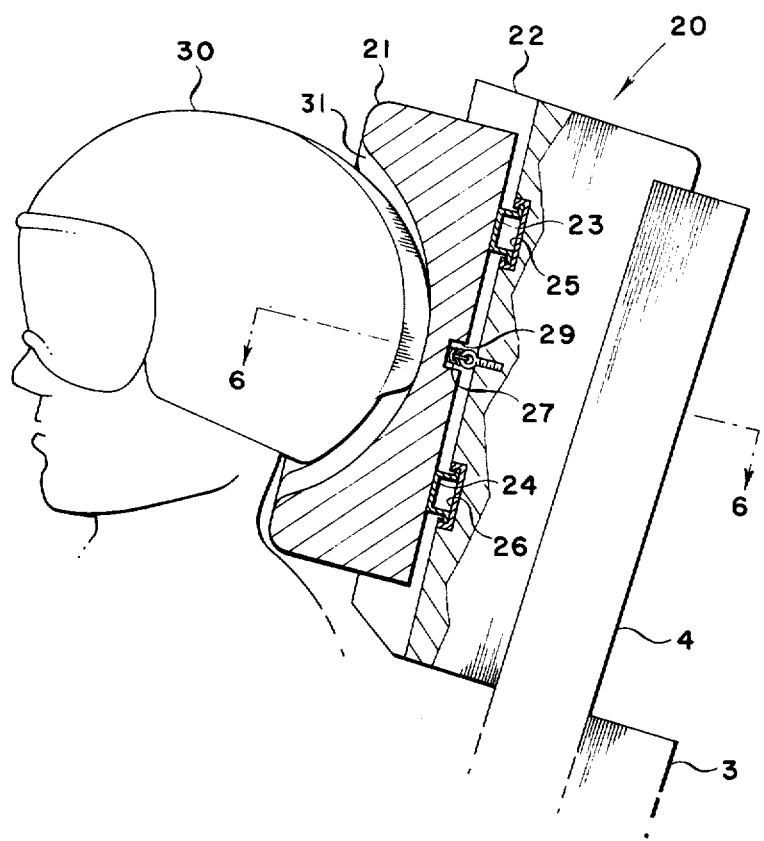
Fig. 5
Fig. 6
Fig. 7
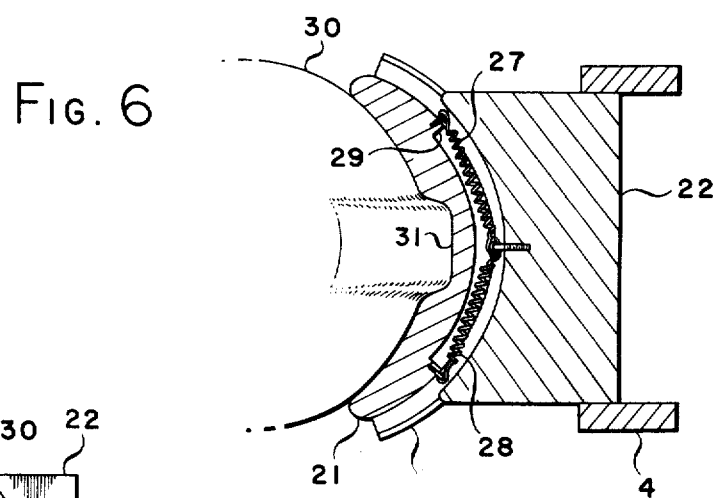
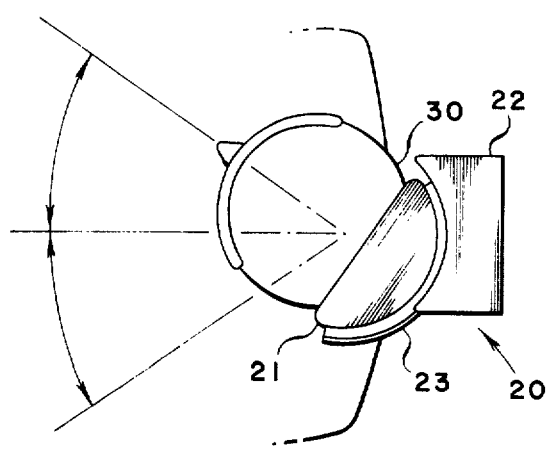

ARTICULATED HIGH "G" PILOT'S SEAT

This is a continuation-in-part of copending application Ser. No. 488,426, filed July 15, 1974, now abandoned.

Fighter aircraft of today have greater performance characteristics than ever before. Increased maneuverability (turn capacity with the higher acceleration factors) imposes higher "G" forces on the pilot with ensuing grayouts and blackouts. Efforts to alleviate the "G" load effects and hold the pilot "G" tolerance within acceptable limits have met with some recent success. It has been found that a reclining position during high acceleration maneuvers prevents pooling of the blood supply and improves circulation to the brain.

However, as presently known, these efforts have not been without sacrifices. Over-the-nose vision and side vision are diminished in the reclined position as compared to the conventional upright position. The pilot's view of the instrument panel and controls reach are also affected. In addition, emergency ejection has presented a number of problems, the solutions ranging from time-consuming return from the reclined to the upright position prior to seat ejection to complete capsule ejection in the reclined position.

A principal object of this invention is to provide an articulated seat which has high "G" force and acceleration capability without exceeding physical limits during maximum sustained aircraft maneuvers.

Another object of this invention is to provide an articulated seat wherein the seat back and pan are movable between upright and reclined positions about a shoulder pivot.

A further object of this invention is to provide a headrest for such an articulated seat wherein the head remains in essentially the same position throughout movement of the seat back and pan, permitting uninterrupted visual tracking of objects within the seat occupant's field of view at all times.

The foregoing and other objects will become apparent from the following description when taken with the accompanying drawings, in which:

FIGS. 1 and 2 are side views in elevation of the pilot's seat of this invention illustrated in the cockpit of an aircraft in the conventional 17° low "G" flight position and a 60° reclined high "G" position as measured from vertical;

FIG. 3 is a side view in elevation showing the details of the seat in the normal position;

FIG. 4 is a side view in elevation showing the seat of FIG. 3 moved to the reclining position;

FIG. 5 is a side view in elevation showing the construction of the movable headrest on the seat assembly;

FIG. 6 is a view taken approximately on line 6—6 of FIG. 5; and

FIG. 7 is a top view in elevation showing the headrest moved in azimuth for side viewing.

Referring to FIG. 1, the normal flight position of the seat is shown, along with a fragmentary portion of the aircraft fuselage 1 and a canopy 2. A rail assembly and support bulkhead 3 is a structural and integral part of the aircraft and supports the seat assembly 4 at the seat/rail interface 5 at an angle of about 17° from the vertical. A translating seat back and pan (to be more fully described) are enclosed within the seat assembly 4. The seat assembly 4 is regarded as fixed during translation, even though the assembly moves with respect to the rail assembly during ejection. An instrument panel 7 is located in front of the pilot and the usual consoles 8 are arranged on either side of the aircraft and within normal reach of the pilot. As illustrated in FIG. 1, the pilot's vision will be substantially as indicated by the angle, and the eye position will be referred to as the "design eye". In FIG. 2, the pilot is shown in the high acceleration or reclined position, and it will be noted that the vision is substantially the same as in FIG. 1. The seat assembly 4 is noted to be in the same position; only the inner translating seat back and pan have moved.

In FIGS. 3 and 4, the seat assembly 4 and related components have been shown, the seat support 3 and assembly 4 having been separated at the seat/rail interface as indicated. The seat assembly is supported on the support by a pair of rails for emergency ejection in the usual manner. As shown in FIG. 3, the seat back 9 and pan 10 are shown in the normal upright position. The seat back 9 is attached at one end to the pivot 11 near shoulder height on the seat assembly 4. The other end (lower) of the seat back is attached to the seat pan.

An actuator 12 is attached to the fixed seat assembly at 13. A pair of links 14, 15 are attached to the lower end of the actuator. The lower end of link 14 is attached to the fixed assembly 4 at 16, and the other link 15 is attached to the rear of the seat back 9 at 17. Operation of the actuator 12 by a self-contained hydraulic system (not shown) causes rotation about pivot 16, and through extension of the actuator the seat back is displaced to the position shown in FIG. 4. As the seat moves forward, the pan portion pivots with respect to the back to the inclined position. Further relative motion is restricted by the stop 18 which bears against the back of the seat back. Guides 19 are used to stabilize the seat at opposite sides during the forward translation.

A headrest 20 is secured to seat assembly 4 above support bulkhead 3, as shown in FIGS. 5 and 6. Forward portion 21 of headrest 20 is attached to a rear portion 22 through spaced arcuate tracks 23 and 24 which engage guide slots 25 and 26 formed in rear portion 22. The tracks and forward portion 21 of the headrest are movable in azimuth, as indicated in FIG. 7. Suitable means may be provided such as springs 27 and 28 in channel 29 formed in forward portion 21 to urge the headrest to a neutral or centered position for receiving the seat occupant's helmet 30.

A channel 31 is cut in forward portion 21 of headrest 20 to receive a detent formed in helmet 30, allowing the occupant's head to move in elevation while the helmet is supported in the headrest for azimuth rotation together with forward portion 21 about a pivot axis generally aligned with the center of rotation of the seat occupant's head.

As can be seen from comparison of FIGS. 1 and 2, and FIGS. 3 and 4, the aircraft seat in accordance with the invention affords a greatly simplified construction. For ejection purposes, the seat assembly/rail assembly interface 5 is undisturbed. Upon command, whether automatic or pilot initiated, the seat back 9 and pan 10 return the pilot to normal sitting position and the ejection sequence is facilitated.

Thus, by fixing the top of the pilot's seat and moving the lower seat forward about a shoulder pivot, the head and shoulders are maintained at essentially the same point for both upright and reclined positions. The result is that the pilot's vision for both the upright and reclined positions is essentially the same. By judiciously selecting the position for seat pivot 11 slightly below the seat occupant's shoulder, as shown in the drawing, the over-the-nose vision for the reclined position can actually be improved over that provided by the same seat in the upright position while producing negligible movement of the head and shoulders during the translation.

The invention as described addresses those problems associated toward eliminating restricted movement and vision of an aircrew member subjected to high acceleration forces during sustained high load factor flight maneuvers. Other items, such as rudder pedal translation, control stick and throttle quadrant configurations, may of course be integrated with the above invention to answer the over-all problems of suitability.

What is claimed is:

1. An articulated high "G" force aircraft seat comprising:
   a rail assembly attached to and constituting an integral aircraft structure;
   a seat assembly supported on said rail assembly and movable relative thereto for ejection;
   a headrest having a rear portion and a forward or helmet receiving portion, said rear portion being secured to said seat assembly, guide means connecting said forward portion to said rear portion for movement of said forward portion about a pivot axis generally coaxially aligned with the intended center of azimuth rotation for the helmeted head of a seat occupant, said forward portion having helmet engaging means requiring said forward portion to move with the helmet in azimuth but not in elevation whereby near normal head motion of the seat occupant may be maintained under high "G" force conditions;
   a seat back pivotally attached at one end approximate normal shoulder height to the seat assembly adjacent said headrest;
   a seat pan pivotally attached to the other end of the seat back; and
   actuator means for moving the seat pan and said other end of the seat back between a normal sitting position and a reclined position.

2. The invention as defined by claim 1, including guide means for the seat pan.

3. The invention as defined by claim 1, wherein the actuator means includes a linear actuator and linkage means attached between the seat assembly and the seat back/pan assembly.

4. The invention as defined in claim 3, wherein the linkage means consists of a pair of links, said pair having one end of each attached to the actuator, the other end of one link being connected to the seat assembly and the other end of the other link being connected to the seat back.

5. The invention as defined by claim 1 and further including stop means on the seat pan to limit movement of the seat pan with respect to the seat back.

6. The invention as defined in claim 1 including spring means for urging said forward portion towards a neutral position.

7. The invention as defined in claim 6 wherein said helmet engaging means comprises a channel formed in said forward portion for receiving a detent on said helmet and allowing movement of the latter relative to the forward portion about an axis transverse to said pivot axis.

* * * * *